United States Patent [19]

Bischofberger et al.

[11] Patent Number: 5,295,583
[45] Date of Patent: Mar. 22, 1994

[54] PROCESS FOR CLEANING SHORT MINERAL FIBERS

[75] Inventors: Ulrich Bischofberger, Stuttgart; Dieter Muller-Schwelling, Fellbach; Ernst Pfleiderer, Backnang, all of Fed. Rep. of Germany

[73] Assignee: Mahle GmbH, Stuttgart, Fed. Rep. of Germany

[21] Appl. No.: 933,999

[22] Filed: Aug. 21, 1992

[30] Foreign Application Priority Data

Aug. 24, 1991 [DE] Fed. Rep. of Germany ....... 4128127

[51] Int. Cl.$^5$ .......................... B03B 7/00; B07B 9/00
[52] U.S. Cl. ......................................... 209/17; 209/21
[58] Field of Search .................. 209/12, 17, 21, 24, 209/25, 28, 29, 134, 156, 173, 135

[56] References Cited

U.S. PATENT DOCUMENTS

| | | | |
|---|---|---|---|
| 3,765,532 | 10/1973 | Morris et al. | 209/17 |
| 3,815,178 | 6/1974 | Goldman | 209/21 X |
| 4,274,949 | 6/1981 | McCarthy | 209/17 |
| 4,750,995 | 6/1988 | Fogerson | 209/17 X |
| 4,913,803 | 4/1990 | Earls et al. | 209/17 |

FOREIGN PATENT DOCUMENTS 3902665 8/1990 Fed. Rep. of Germany .
1286298 1/1987 U.S.S.R. .................. 209/17

*Primary Examiner*—Joseph E. Valenza
*Assistant Examiner*—Tuan N. Nguyen
*Attorney, Agent, or Firm*—Collard & Roe

[57] ABSTRACT

In a process for cleaning short mineral fibers in which the fibers contaminated with foreign bodies are separated from the foreign bodies, at least starting with a certain size, whereby mechanical damage to the fibers is avoided. For this purpose, the crude fiber material to be cleaned is added to a carrier medium which is set in a flowing motion and subsequently passed along a separation apparatus with at least one slot-like recess in the direction of the longitudinal extension of the recess. Thus, at least part of the carrier medium passes from an upstream side through the recess, together with the fibers, to a downstream side. In this way, a fiber filtrate is produced, of which the degree of purity is solely determined by the width of the recess. The carrier medium mixed with the crude material can be circulated in the cleaning process, with the carrier medium separated from the clean fiber filtrate being continuously returned to said circulation as well.

14 Claims, 1 Drawing Sheet

PROCESS FOR CLEANING SHORT MINERAL FIBERS

BACKGROUND OF THE INVENTION

1. Field of the Invention

The present invention relates to a process for cleaning short mineral fibers that are contaminated with foreign bodies, which process uses a separation apparatus having a filter medium with slot-like recesses.

2. The Prior Art

Short fibers have an average length typically of 0.1 to 5 mm and an average diameter of approximately 0.1 to 10 $\mu$m. The foreign bodies are predominantly non-fiber-like, nearly spherical particles, or fragments thereof, of the same material as the fibers, which originate as so-called "shots" with a diameter between about 50 and 2,000 $\mu$m through the formation of droplets in the manufacture of the fibers, for example from highly viscous liquid in the free jet process.

Fiber composite materials include a fiber-reinforced metal matrix. When these fiber composite materials produced therefrom are cyclically stressed, shots of a size starting with a diameter of from 50 to 100 $\mu$m cause cracking, especially within the metal matrix. In this way, the shots affect the otherwise good mechanical properties of fiber-reinforced metal matrix (for example, those used for the manufacture of pistons for internal-combustion engines) in an unfavorable way. For this reason, it is desirable to completely separate these shots from the fibers through suitable cleaning methods.

A known process for cleaning the fibers is the floatation of a preferably aqueous crude fiber suspension. In this process, the fibers are separated from the foreign bodies as a result of their greater specific surface area per unit volume. The drawback with this prior art process is that no complete separation of the fibers from the foreign bodies can be achieved. It is conceivable, for example, that shots contains in fiber balls are discharged together with the clean fiber suspension.

Another known process is the cleaning of the fibers through filtration of a preferably aqueous crude fiber suspension. As compared to floatation, complete separation of the mixture to be cleaned can be achieved through filtration. However, a problem with this prior art process is that there is always the filtration of fibers having a length greater than, for example, the width of the mesh of the sieve used for the filtration. The problem develops because after only a short time, a filter cake forms, which holds back both fibers and foreign bodies, which causes the separation process to stop. This problem can be resolved by the known methods of filtration only in an unsatisfactory way. As a result, a cleaning through filtration is, in the last analysis, possible only in connection with a mechanical damaging especially of the longer and longest fibers contained in the crude suspension. These fibers can break to a considerable extent, and may be partly obtained in powder form. In any case, the fibers cleaned by filtration are clearly shorter than in the starting condition.

SUMMARY OF THE INVENTION

It is an object of the present invention to provide a cleaning process in which the short fibers are completely separated from foreign bodies, particularly from shots starting with a certain size, and in which the fibers are not mechanically damaged even if they are substantially longer than, for example, the diameter of the smallest shots to be separated therefrom.

The above object is achieved according to the present invention by providing a process for cleaning short mineral fibers, in which the fibers contaminated with foreign bodies are separated from the foreign bodies which have at least a starting size, comprising: (a) adding a contaminated fiber material to a carrier medium and setting the carrier medium in a flowing motion; and (b) circulating the carrier medium through a separation apparatus having an upstream side and a downstream side with at least one slot-like recess between the upstream and the downstream in the direction of a longitudinal extension of the recess, whereby at least a part stream of the carrier medium passes from the upstream side through the recess together with the fibers, forming a fiber filtrate at the downstream side of which the degree of purity is solely determined by the width of the recess.

By setting the fibers in motion with the help of a selected certain flowing carrier medium, the fibers will align themselves with their longitudinal axes, preferably parallel to the direction of flow in zones of laminar flow with flow rate gradients. Examples of these zones include the walls of the apparatus or near the slot-shaped separation apparatus. (For example, it is known that tree trunks may be carried along by flowing waters.)

The flowing carrier medium with the crude fibers (crude mixture) passes along through a separation apparatus having at lest one slot-like recess, i.e., a much longer recess than a wider recess in the direction of the longitudinal extension of said recess. Those of the fibers carried along in the carrier medium which are close enough to the recess can be carried by the suspension liquid through the slots. The passage of the carrier medium through the slots takes place as a result of the pressure gradient between the flowing crude mixture on the upstream unfiltered side of the separation apparatus, and the free-flowing downstream clean filtered side of the separation apparatus. The downstream side is connected with the upstream end through the slot-like recesses, based upon the principle of cross-flow filtration.

A fiber filtrate is produced, of which the degree of purity is solely determined by the width of the slots of the separation apparatus. As shots starting with a size of 50 to 100 $\mu$m are undesirable, the width of the recess is correspondingly on this order of magnitude. This means that the substantially thinner fibers can migrate through the recesses without mechanical damage. On the other hand, for example, the shots on the upstream unfiltered side of the separation apparatus are held back by the recess, and flow off with the remaining crude mixture from the upstream unfiltered side of the separation apparatus.

Advantageously, an aqueous crude suspension is conveyed by circulation, and always only a part is filtered off as clean fibers together with a part of the circulating medium. The fiber concentration in the upstream crude mixture should substantially not exceed 0.1% by volume.

Particularly preferable for this process is a tubular slotted sieve, in connection with which one single long gap winds across the entire length of the tube in the form of a spiral. Such sieves are commercially available and need not be specially made for this process.

BRIEF DESCRIPTION OF THE DRAWINGS

Other objects and features of the present invention will become apparent from the following detailed description considered in connection with the accompanying drawings, which disclose one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
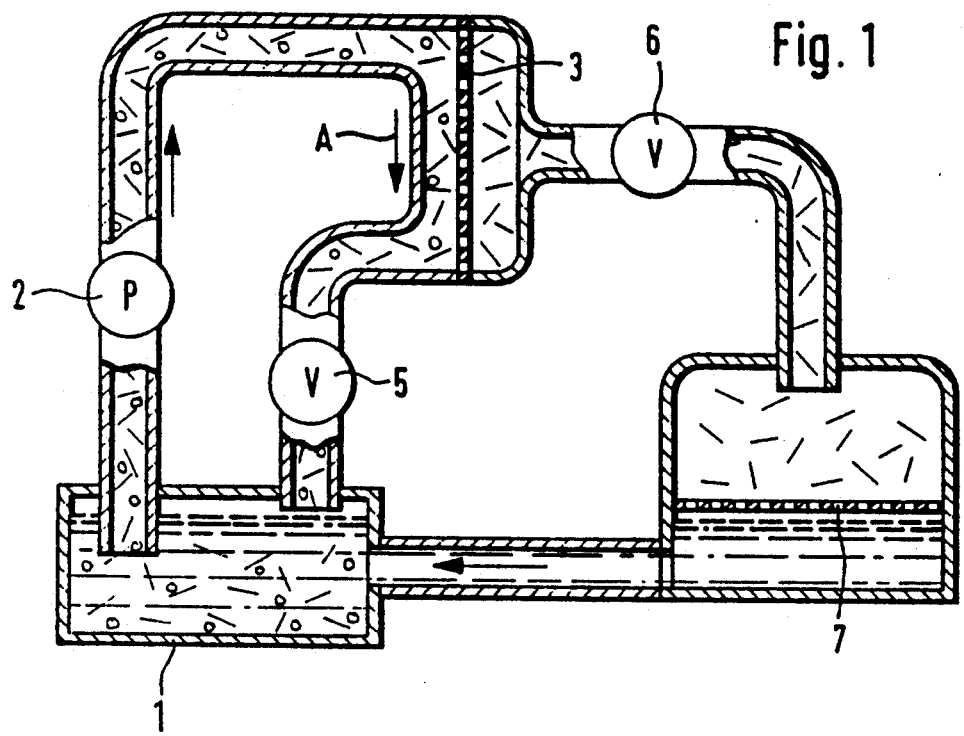
FIG. 1 shows a flow diagram of the cleaning process.
Figure 2:
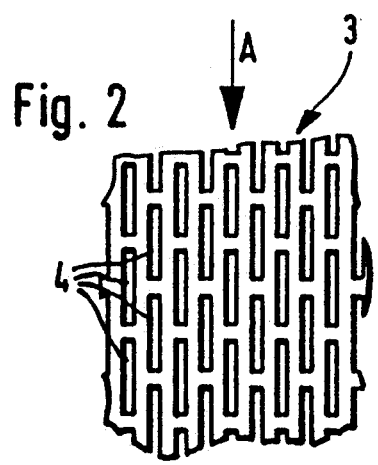
FIG. 2 shows, in the form of a cutout, a surface plan view of a filter applicable by way of example; the initial direction of flow is indicated by arrow A.

Turning now in detail to the drawings, FIG. 1 shows a flow diagram for cleaning the crude mineral fibers to be cleaned. The fibers are placed in a supply vessel 1 in the form of an aqueous suspension with a fiber volume concentration of about 0.1 volume percent. This suspension is circulated with the help of a pump 2 along a cross-flow filter 3. The cross-flow filter 3 has the passage slots 4 (FIG. 2) which are aligned parallel to one another. The length of each slot is approximately 10 mm. The width of the individual slots, which is the same in each case, depends on the size of the impurities to be separated, i.e., of which the crude fibers are to be cleaned.

When crude fibers with an average diameter of 3 $\mu$m and an average length of 100 to 500 $\mu$m have to be cleaned, and if such fibers, upon cleaning, are not to have any impurities with diameters above 50 $\mu$m, then the slots have to have a width of 50 $\mu$m, so that the respective impurities can be held back.

Usefully, the slot lengths are selected in such a way that they extend in each case across the total length of the filter. If a tubular filter is used, one single spirally extending slot can be used. Such filters are known as edge gap filters.

The flow of the suspension takes place in the longitudinal direction of the filter slots 4.

A pressure difference between the upstream crude upside and the downstream clean side is acting on the filter, causing part of the suspension with the clean fibers to penetrate the filter 3 according to the cross-flow filter principle. The remaining part containing a concentration of the particles to be separated is returned to the supply vessel. The pressure differential across the filter 3 is suitably adjusted using the valves 5 and 6.

On the downstream clean side of the filter 3, the clean fibers are separated by means of a sieve 7 from the liquid acting as the carrier medium. The liquid is returned to supply vessel I for recycling and recirculation.

Preferably, the separation process is carried out as a batch operation, whereby the fiber concentration in the circulating liquid decreases down to an adjusted lower value. Subsequently, the circulation liquid can be exchanged, i.e., a new suspension has to be prepared in the supply vessel 1.

However, it is possible also to add crude fiber material upstream continuously or discontinuously to the circulation liquid, and to change the circulation liquid only after the amount of impurities in the circulation liquid has reached a preselected maximum value.

The cleaning process described above can be advantageously used for testing the shot content of short fibers.

In order to determine, for example, the shot concentration (shots greater than 100 $\mu$m) of crude fibers, about 30 g of fiber material is suspended in 1 liter of water and, in the way described above, is circulated along a slotted sieve (slot width=100 $\mu$m) until all the fibers have passed through the sieve. The aqueous solution remaining on the upstream crude side contains the shots. The shots are isolated by filtering them off, for example, using a commercially available filter paper. The shot concentration is then determined either microscopically or gravimetrically, based on this filtrate.

While only one embodiment of the present invention has been shown and described, it is to be understood that many changes and modifications may be made thereunto without departing from the spirit and scope of the invention as defined in the appended claims.

What is claimed is:

1. A process for cleaning short mineral fibers, in which the fibers contaminated with foreign bodies are separated from the foreign bodies which have at least a starting size, comprising:
    (a) adding a contaminated fiber material to a carrier medium and setting the carrier medium in a flowing motion; and
    (b) circulating the carrier medium through a separation apparatus having an upstream side and a downstream side with at least one slot-like recess between the upstream and the downstream in the direction of a longitudinal extension of the recess; whereby at least a part stream of the carrier medium passes from the upstream side through the recess together with the fibers, forming a fiber filtrate at the downstream side of which the degree of purity is solely determined by the width of the recess.

2. The process according to claim 1, wherein the fibers to be cleaned have an average diameter in the range of at least 0.1 $\mu$m, up to 10 $\mu$m.

3. The process according to claim 1, wherein the fibers to be cleaned have an average length of at least 10 times the average diameter.

4. The process according to claim 1, wherein the carrier medium is gaseous.

5. The process according to claim 1, wherein the carrier medium is liquid.

6. The process according to claim 1, wherein the flowing carrier medium with the contaminated fibers is passed along the separation apparatus, of which at least one slot-like recess is at least three times longer than it is wide.

7. The process according to claim 1, wherein the carrier medium mixed with contaminated fibers and impurities is circulated by means of cross-flow filtration through a filter, through which a part stream still only containing clean fibers flows, said part stream being recycled and returned again to the circulating stream after the separation of the clean fibers.

8. A process for cleaning short mineral fibers, in which the fibers contaminated with foreign bodies are separated from the foreign bodies which have at least a starting size, comprising:

(a) adding a contaminated fiber material to a carrier medium and setting the carrier medium in a flowing motion;

(b) circulating the carrier medium through a separation apparatus having an upstream side and a downstream side with at least one slot-like recess between the upstream and the downstream in the direction of a longitudinal extension of the recess; and wherein the fibers to be cleaned have an E-modulus of at least 100 GPa, whereby at least a part stream of the carrier medium passes form the upstream side through the recess together with the fibers, forming a fiber filtrate at the downstream side of which the degree of purity is solely determined by the width of the recess.

9. A process for cleaning short mineral fibers and for testing the shot content of short fibers, in which the fibers are contaminated with shot and are separated from the shot which have a starting size of greater than 100 $\mu$m, comprising:

(a) adding a contaminated fiber material to a aqueous carrier medium and setting the carrier medium in a flowing motion;

(b) circulating the carrier medium through a separation apparatus having an upstream side and a downstream side with at least one slot-like recess between the upstream and the downstream in the direction of a longitudinal extension of the recess;

(c) whereby at least a part stream of the carrier medium passes from the upstream side through the recess together with the fibers, forming a fiber filtrate at the downstream side of which the degree of purity is solely determined by the width of the recess; and (d) the aqueous carrier medium on the upstream side containing the shot, the shot being isolated as a shot filtrate by filtering off shot, and determining the shot concentration either microscopically or gravimetrically, based on this shot filtrate.

10. The process according to claim 9, wherein the fibers to be cleaned have an E-modulus of at least 100 GPa.

11. The process according to claim 9, wherein the fibers to be cleaned have an average diameter in the range of at least 0.1 $\mu$m, up to 10 $\mu$m.

12. The process according to claim 9, wherein the fibers to be cleaned have an average length of at least 10 times the average diameter.

13. The process according to claim 9, wherein the flowing carrier medium with the contaminated fibers is passed along the separation apparatus, of which at least one slot-like recess is at least three times longer than it is wide.

14. The process according to claim 9, wherein the carrier medium mixed with contaminated fibers and impurities is circulated by means of cross-flow filtration through a filter, through which a part stream still only containing clean fibers flows, said part stream being recycled and returned again to the circulating stream after the separation of the clean fibers.

* * * * *